ELECTRO-SONIC FLUID AMPLIFIER

Original Filed Feb. 16, 1961

INVENTORS
NORMAN A. CARGILL
TREVOR D. READER

BY Griffin and Stokes
ATTORNEYS

ELECTRO-SONIC FLUID AMPLIFIER

Original Filed Feb. 16, 1961

INVENTORS
NORMAN A. CARGILL
TREVOR D. READER

BY Griffin and Stokes
ATTORNEYS

United States Patent Office

Re. 26,605
Reissued June 10, 1969

26,605

ELECTRO-SONIC FLUID AMPLIFIER

Norman Allen Cargill, Warminster, and Trevor Drake Reader, King of Prussia, Pa., assignors to Sperry Rand Corporation, New York, N.Y., a corporation of Delaware Original No. 3,144,037, dated Aug. 11, 1964, Ser. No. 89,863, Feb. 16, 1961. Application for reissue July 7, 1965, Ser. No. 470,304

Int. Cl. F15c *1/08, 1/12, 1/14*

U.S. Cl. 137—81.5 3 Claims

Matter enclosed in heavy brackets [ ] appears in the original patent but forms no part of this reissue specification; matter printed in italics indicates the additions made by reissue.

*ABSTRACT OF THE DISCLOSURE*

*This invention relates to a fluid amplifier which provides a vibrating diaphragm in each of the fluid control signal chambers. These diaphragms may be selectively actuated by electrical means to produce control signals which switch the amplifier. Furthermore, a plurality of control outlets may be symmetrically arranged around the inlet power stream to control divergence of the stream into selected outlets equal in number to the control outlets.*

The present invention relates to fluid amplifiers and more particularly to means for electrically controlling the switching of the fluid stream within a fluid amplifier. The present invention provides a vibrating diaphragm in each of the fluid control signal chambers found in conventional fluid amplifiers. These diaphragms are selectively actuated by electrical means to produce the fluid control signals which switch the amplifier.

Fluid amplifiers per se comprise a recent addition to the control and data processing arts. Basic research has led to the development of amplifiers wherein small fluid control streams may be used to control the switching action of larger fluid streams known as power streams. By proper choice of certain parameters such as channel shapes and working pressures, fluid amplifiers may be made multistable. That is, fluid flow through the amplifier may assume any one of several stable states depending upon the control signal last applied to the amplifier. Further information concerning the construction and mode of operation of fluid amplifiers may be found in the June 1960 issue of Science and Mechanics.

The power stream of multistable fluid amplifiers now known in the art must be controlled by fluid control streams. This presents a problem in systems where the input signals may be electrical rather than fluid. In systems of the prior art, the electrical signals have been converted to fluid signals by using an electrically operated fluid valve. Because of the mass of the mechanical elements which must be moved in a fluid valve, these devices are not capable of converting the electrical signals as fast as the switching rate (20 kc.) of the fluid amplifier.

Therefore, an object of the present invention is to provide means for converting electrical signals to fluid signals at a rate compatible with the switching rate of a fluid amplifier.

An object of this invention is to provide means for controlling a fluid stream with electrical signals without the aid of an electromechanical transducer.

A further object of the present invention is to provide means for amplifying a small electrical signal into a much larger mechanical signal.

A still further object of the present invention is provide electromagnetic means for switching a fluid amplifier to any one of several stable states.

Another object of the invention is to provide diaphragms in the control signal input chambers of fluid amplifiers, with electrically operated means for vibrating said diaphragms.

Further objects and the mode of operation of the invention will become apparent upon consideration of the following specification and drawings in which.

Figure 2:
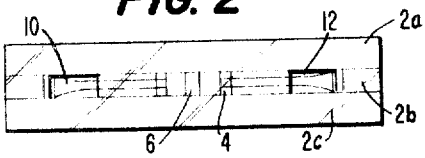
FIGURE 2 is a top view of the fluid amplifier of FIGURE 1.
Figure 1:
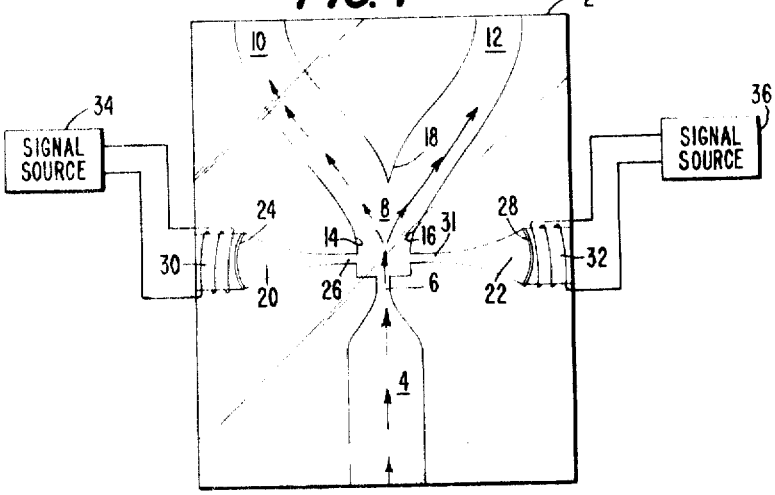
FIGURE 1 is a view, partly in section, of a multistable state fluid amplifier controlled in accordance with the present invention and having two stable states.

The fluid amplifier shown in FIGURES 1 and 2 comprises a substantially solid body 2 having a plurality of fluid passageways through which the working fluid may flow. The working fluid may be either air or another gas or water or another liquid.

For purposes of illustration, the body 2 is shown as made of three transparent plastic laminations 2a, 2b, and 2c since in one method of manufacture it is customary to mold or otherwise form the fluid passageways in one plastic laminate which is then covered on each side with solid plastic sheets. However, the present invention may be utilized with many types of multistable fluid amplifiers and is not limited to amplifiers made in accordance with this method. Reference should be made to the prior art for other materials, methods of manufacture and configurations of fluid amplifiers which result in multistable operation and are therefore adaptable for use in the present invention.

A compressor or pump (not shown) supplies a suitably regulated stream of fluid to the power stream input chamber or passageway 4. The power stream, which may utilize pressures up to 60 lbs./sq. in., passes through restrictive orifice 6 and emerges into chamber 8 as a high velocity jet stream. In practice the orifice may be extremely small and may for instance be less than .0025 square inch in cross section. The chamber 8 is formed by the convergence of left output passageway 10 and right output passageway 12.

The left wall 14 and right wall 16 of the chamber are set back from the orifice 6 and, in accordance with Bernoulli's Theorem, the high velocity jet issuing from the orifice creates regions of low pressure adjacent these walls. Within these regions of low pressure are layers of fluid which move at a much slower speed than the jet stream, hence these regions are referred to as boundary layers. By properly designing the chamber 8, these low pressure areas may be utilized to control the flow path of the jet issuing from the orifice.

In the example shown, this is accomplished in part by asymmetrically placing the body 18 so that the opening from the chamber into passageway 10 is greater than the opening from the chamber into passageway 12. Under these conditions, and assuming there are no control signal inputs, the jet stream issuing from orifice 6 will tend to enter passageway 10 because of the lower pressure. As the jet stream moves into this passageway it creates an even lower pressure in the region adjacent wall 14 and because of the low pressure along this wall "locks on" to the wall 14. This condition may be considered a first stable state wherein the power stream entering passageway 4 flows along a path as indicated by the broken arrows.

As indicated above, a stable condition exists when the fluid stream is locked on the wall 14. That is, this condition is maintained as long as fluid is supplied to passageway 4 and nothing happens to disturb the jet stream.

Two control signal input chambers 20 and 22 are provided for control purposes. The chamber 20 is sealed at one end by a diaphragm 24, the other end of the chamber having an orifice 26 in the left wall of the chamber 8. In like manner, chamber 22 is sealed at one end by a diaphragm 28 and terminates at the opposite end in an orifice 3 in the right wall of chamber 8. Both chambers are filled with fluid which may be air or some other gas, or water or some other liquid.

The chambers themselves should preferably be provided with an exponentially tapering cross-section similar to that employed in horn type loud speakers and the diaphragms 24 and 28 may be spherically shaped as are the diaphragms of such loud speakers.

A pair of electromagnets 30 and 32, energized by signal sources 34 and 36, respectively, are mounted adjacent the diaphragms. Application of a signal to one of the magnets creates a pulsating magnetic field to vibrate the corresponding diaphragm.

Assuming that the amplifier is in a first stable state with the power jet stream flowing as indicated by the broken line, the amplifier may be switched to a second stable state as follows.

A signal from source 34 is applied to the magnet 30 to generate a magnetic field. This field causes the diaphragm 24 to vibrate in the same manner as the magnetic coil in a radio speaker causes its diaphragm to vibrate. The vibrations of the diaphragm cause the generation of compressional waves in the fluid contained in chamber 20. These waves travel through the fluid contained in the chamber and pass through orifice 26 into chamber 8.

Note that the orifice 26 is located in left wall 14 near the region of low pressure and slow moving fluid. The compressional waves upon passing through the orifice first break or disperse the boundary layer thus creating a condition of instability and then tend to push the power stream into a second state. As the power stream is pushed to the right, it withdraws more and more molecules of fluid from the region adjacent wall 16 thus creating a low pressure region. The power stream moves into this low pressure region and locks on to the wall 16. As a result, the fluid amplifier attains a second stable in which fluid flows through the output passageway 12 as indicated by the solid arrows.

Application of a signal to electromagnet 32 causes diaphragm 28 to vibrate and produce compressional waves which pass through orifice 31. These waves first break or disperse the boundary layer adjacent wall 16, again creating a condition of instability, and then deflect the power stream into passageway 10 where the power stream locks on to wall 14.

In summary, application of an electrical signal to magnet 30 causes the power stream to flow through output passageway 12 as indicated by the solid arrows. The power stream maintains this path of flow until an electrical signal is applied to magnet 32 at which time the power stream switches and flows through output passageway 10 as indicated by the broken arrows. Switching of the fluid power stream by electrical signals is accomplished without the aid of moving parts other than the vibrating diaphragms 24 and 28. Also, both magnets 30 and 32 can be simultaneously pulsed and the bistable device of FIGURE 1 will behave much like a binary counter in that the power jet will be switched back and forth between passageways 10 and 12 with each successive pulsing.

Figure 3:
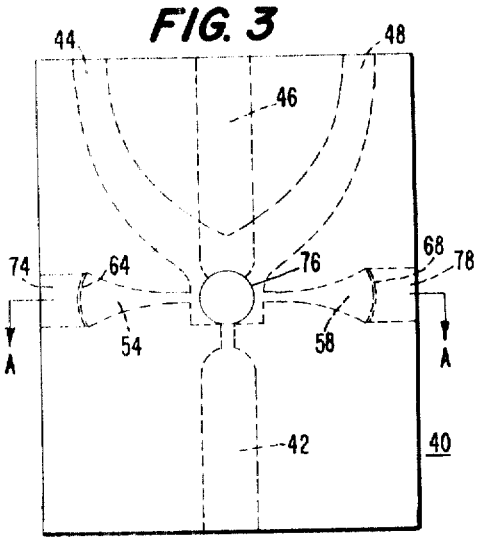
FIGURE 3 is a side view of a multistable fluid amplifier having four stable states.
Figure 4:
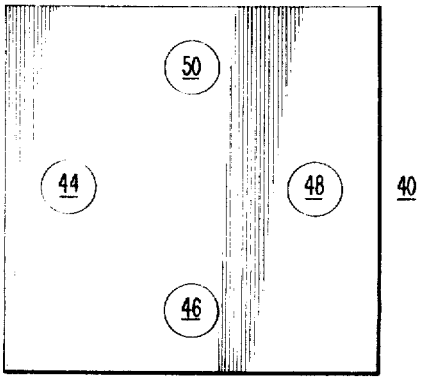
FIGURE 4 is a top view of FIGURE 3.
Figure 5:
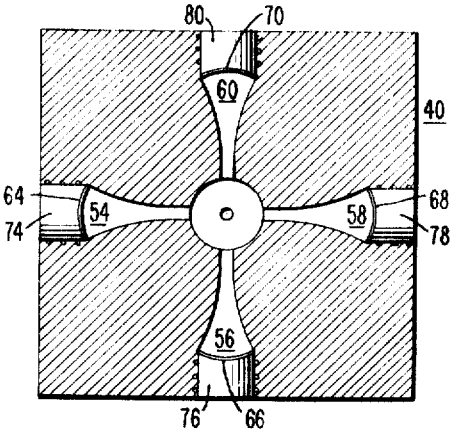
FIGURE 5 is a sectional view of FIGURE 3 taken along the line A—A.

FIGURES 3, 4, and 5 illustrate how the present invention may be adapted to switch the power stream of a fluid amplifier to any desired one of M stable states where M is any even integer.

The fluid amplifier 40 has four stable states of operation and comprises a power stream input passageway 42, four output signal passageways 44, 46, 48, and 50, and four control signal input chambers 54, 56, 58 and 60 having diaphragms 64, 66, 68, and 70 which are operated by magnets 74, 76, 78, and 80. For maximum reliability the center line of chamber 54 should lie in the same plane as the axis of chamber 58 and the axis of chamber 56 should lie in the same plane as the axis of chamber 60. These planes are vertical into the page as the chambers are viewed in FIGURE 5.

The multistable amplifier of FIGURE 3 operates on the same principle as the bistable amplifier of FIGURE 1. That is, a signal applied to one of the electromagnets vibrates the corresponding diaphragm to set up compressional waves in one of the control signal chambers. The compressional waves first break up the boundary layer and then deflect the power stream into the output signal passageway directly opposite the control signal chamber in which the compressional waves are set up. That is, energization of electromagnet 74 deflects the power stream to output passageway 48, energization of electromagnet 76 deflects the power stream to output passageway 50, energization of electromagnet 78 deflects the power stream to output passageway 44, and energization of electromagnet 80 deflects the power stream to output passageway 46. In each instance, the power stream continues to flow out through the passageway to which it was last deflected until another electromagnet is energized.

The electromagnets do not have to be energized in any particular sequence although in some instances it may be desirable to do so.

Figure 6:
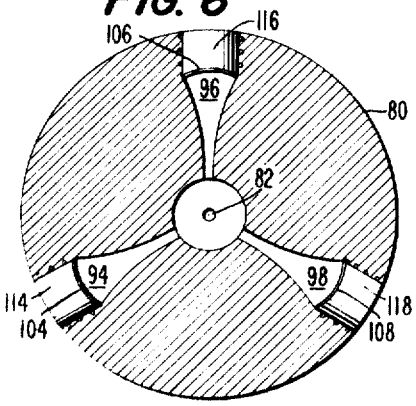
FIGURES 6 and 7 are a sectional view and a top view of a multistable fluid amplifier having three stable states.
Figure 7:
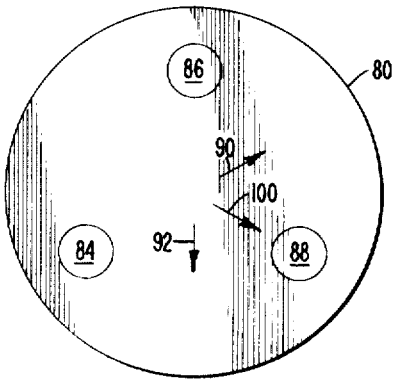

FIGURE 6 is a cross sectional view of a multistable fluid amplifier having three stable states. This embodiment illustrates how the present invention may be adopted to switch the power stream of a fluid amplifier to any one of M stable states where M is any odd integer greater than one.

The fluid amplifier 80 has three stable states of operation and comprises a power stream input passageway 82, three output signals passageways 84, 86, and 88, and three control signal input chambers 94, 96, and 98 having diaphragms 104, 106, and 108 which are operated by electromagnets 114, 116, and 118 respectively.

The tristable amplifier of FIGURE 6 operates on the principle of boundary layer control and deflection of the power stream in much the same manner as the multistable amplifier of FIGURE 3 and the bistable amplifier of FIGURE 1. However, this embodiment switches the power stream between the output passageways 84, 86, and 88 in response to electrical signals applied simultaneously to at least two of the three electromagnets 114, 116, and 118.

Assume for example that the magnets 114 and 116 are energized simultaneously to vibrate the diaphragms 104 and 106, thus producing compressional waves in chambers 94 and 96. The compressional waves from chamber 94 will tend to deflect the power stream in the direction indicated by vector 90. At the same time, compressional waves from chamber 96 will tend to deflect the power stream in the direction indicated by vector 92. As a result the power stream will be deflected in the direction indicated by vector 100 which is the resultant of the two forces represented by vectors 90 and 92, and the power stream will flow out of the amplifier through output passageway 88.

Likewise, simultaneous application of signals to electromagnets 116 and 118 causes the power stream to be deflected to output passageway 84 and simultaneous application of signals to electromagnets 114 and 118 causes the power stream to be deflected to output passageway 86. In each instance the power stream continues to flow out through the output passageway to which it was last deflected until another pair of electromagnets is energized to deflect it to one of the other output passageways.

[While the novel features of the invention as applied to preferred embodiments have been shown and described, it will be understood that various omission and substitutions in the form and detail of the device illustrated may be made by those skilled in the art without departing from the spirit of the invention.]

[For example, each diaphragm may be provided with a plurality of electromagnets energized from different sources, thus permitting several signal sources to control one input to the amplifier. Alternatively, the amplifier may be provided with additional control signal chambers and ouput passageways to permit any number of stable states of operation. Furthermore, less than all the control signal input chambers may be provided with vibrating diaphragms with the remaining chambers being supplied with fluid control signals. This combination provides an amplifier and switching device which responds to either fluid or electrical signals.]

It is intended therefore [to] *that the invention* be limited only by the scope of the appended claims.

We claim:

1. A tristable device comprising: a fluid amplifier of the type having interconnected fluid passageways whereby a fluid power stream may flow from an input chamber to any one of three output passageways; first, second, and third control signal input chambers each having an orifice adjacent the flow path of said fluid power stream for deflecting said fluid stream to one of said output passageways; a diaphragm for each of said fluid control signal input chambers for generating compressional wave control signals therein; and means for selectively and simultaneously vibrating said diaphragms in pairs to thereby deflect said fluid power stream to one of said output passageways.

2. A tristable device as claimed in claim 1 wherein said orifices are positioned such that said fluid power stream is deflected to a first of said output passageways in response to simultaneous vibration of the diaphragms in said second and third control signal input chambers, said fluid power stream is deflected to a second of said output passageways in response to simultaneous vibration of the diaphragms in said first and third control signal input chambers, and said fluid power stream is deflected to a third of said output passageways in response to simultaneous vibration of the diaphragms in said first and second control signal input chambers.

*3. A fluid amplifier comprising, an input channel, a plurality of output channels symmetrically and concentrically arranged with respect to the longitudinal axis of said input channel, a like plurality of control channels symmetrically arranged about said input channel such that the resultant force of control fluid applied to any two adjacent control channels deflects power fluid applied to said input channel to a selected one of said plurality of output channels.*

References Cited

The following references, cited by the Examiner, are of record in the patented file of this patent or the original patent.

UNITED STATES PATENTS

| | | | |
|---|---|---|---|
| 1,628,723 | 5/1927 | Hall | 137—83 X |
| 3,001,539 | 9/1961 | Huruitz | 137—83 |
| 3,001,698 | 9/1961 | Warren | 137—83 X |
| 3,016,063 | 1/1962 | Hausmann | 137—597 |
| 3,016,066 | 1/1962 | Warren | 137—624.14 |

SAMUEL SCOTT, *Primary Examiner.*